United States Patent
Tsai et al.

(10) Patent No.: US 11,842,378 B2
(45) Date of Patent: Dec. 12, 2023

(54) SYSTEMS AND METHODS FOR PRODUCT IDENTIFICATION USING IMAGE ANALYSIS AND TRAINED NEURAL NETWORK

(71) Applicant: CaaStle, Inc., New York, NY (US)

(72) Inventors: Yu-Cheng Tsai, Santa Clara, CA (US); Dongming Jiang, Los Angeles, CA (US); Georgiy Goldenberg, Los Altos, CA (US)

(73) Assignee: CAASTLE, INC., New York, NY (US)

( * ) Notice: Subject to any disclaimer, the term of this patent is extended or adjusted under 35 U.S.C. 154(b) by 0 days.

(21) Appl. No.: 17/683,885

(22) Filed: Mar. 1, 2022

(65) Prior Publication Data
US 2022/0179902 A1 Jun. 9, 2022

Related U.S. Application Data

(63) Continuation of application No. 16/947,142, filed on Jul. 20, 2020, now Pat. No. 11,294,952, which is a
(Continued)

(51) Int. Cl.
*G06K 9/00* (2022.01)
*G06Q 30/0601* (2023.01)
(Continued)

(52) U.S. Cl.
CPC ....... *G06Q 30/0625* (2013.01); *G06F 16/583* (2019.01); *G06F 18/214* (2023.01);
(Continued)

(58) Field of Classification Search
CPC .. G06F 16/583; G06K 9/6215; G06K 9/6256; G06K 9/628; G06Q 30/0625; G06T 7/194; G06T 2207/20081; G06T 2207/20088
(Continued)

(56) References Cited

U.S. PATENT DOCUMENTS 10,109,051 B1 * 10/2018 Natesh ................. G06V 20/10
10,242,036 B2    3/2019 Kwon et al.
(Continued)

FOREIGN PATENT DOCUMENTS

| CN | 105046280 A | 11/2015 |
| CN | 109670591 A | 4/2019 |
| CN | 110363213 A | 10/2019 |

OTHER PUBLICATIONS

Liang, Xiaodan, et al. "Clothes co-parsing via joint image segmentation and labeling with application to clothing retrieval." IEEE Transactions on Multimedia 18.6, 2016, 1175-1186. (Year: 2016).
(Continued)

*Primary Examiner* — Jonathan S Lee
(74) *Attorney, Agent, or Firm* — Bookoff McAndrews, PLLC

(57) ABSTRACT

Disclosed are methods, systems, and non-transitory computer-readable medium for analysis of images including wearable items. For example, a method may include obtaining a first set of images, each of the first set of images depicting a product; obtaining a first set of labels associated with the first set of images; training an image segmentation neural network based on the first set of images and the first set of labels; obtaining a second set of images, each of the second set of images depicting a known product; obtaining a second set of labels associated with the second set of images; training an image classification neural network based on the second set of images and the second set of labels; receiving a query image depicting a product that is not yet identified; and performing image segmentation of the query image and identifying the product in the image by performing image analysis.

20 Claims, 9 Drawing Sheets

Related U.S. Application Data continuation of application No. 16/783,289, filed on Feb. 6, 2020, now Pat. No. 10,769,198.

(51) Int. Cl.
| | | |
|---|---|---|
| *G06F 16/583* | (2019.01) | |
| *G06T 7/194* | (2017.01) | |
| *G06F 18/22* | (2023.01) | |
| *G06F 18/214* | (2023.01) | |
| *G06F 18/2431* | (2023.01) | |
| *G06V 10/764* | (2022.01) | |
| *G06V 10/82* | (2022.01) | |
| *G06V 40/10* | (2022.01) | |

(52) U.S. Cl.
CPC .......... *G06F 18/22* (2023.01); *G06F 18/2431* (2023.01); *G06T 7/194* (2017.01); *G06V 10/764* (2022.01); *G06V 10/82* (2022.01); *G06V 40/10* (2022.01); *G06T 2207/20081* (2013.01); *G06T 2207/20088* (2013.01)

(58) Field of Classification Search
USPC ......................................................... 382/156
See application file for complete search history.

(56) References Cited

U.S. PATENT DOCUMENTS

| | | |
|---|---|---|
| 10,402,648 B1 | 9/2019 | Shimozaki |
| 10,424,064 B2 | 9/2019 | Price et al. |
| 10,453,197 B1 | 10/2019 | Cholakkal et al. |
| 10,474,900 B2 | 11/2019 | Hare et al. |
| 10,475,250 B1 | 11/2019 | Huang et al. |
| 10,614,574 B2 | 4/2020 | Zhang |
| 10,769,198 B1 | 9/2020 | Tsai et al. |
| 10,824,942 B1 | 11/2020 | Bhotika et al. |
| 10,963,939 B1 | 3/2021 | Zehr et al. |
| 10,970,768 B2 | 4/2021 | Zheng et al. |
| 11,017,261 B1 | 5/2021 | Zheng et al. |
| 11,080,273 B2 | 8/2021 | Bandyopadhyay et al. |
| 2011/0142335 A1 | 6/2011 | Ghanem et al. |
| 2013/0121571 A1* | 5/2013 | Gokturk .................. G06V 10/56 382/165 |
| 2014/0010449 A1 | 1/2014 | Haaramo et al. |
| 2015/0127592 A1 | 5/2015 | Yan et al. |
| 2016/0117587 A1 | 4/2016 | Yan et al. |

OTHER PUBLICATIONS

Jhaveri, Harshil, Divyam Sheth, and Kiran Bhowmick. "Autoencoder Embedding, Segmentation and Classification of Apparel Images using a Deep ConvNet Approach." 2020 4th International Conference on Electronics, Communication and Aerospace Technology (ICECA). IEEE, 2020. (Year: 2020).

Jia, Menglin, et al. "Fashionpedia: Ontology, segmentation, and an attribute localization dataset." European conference on computer vision. Springer, Cham, 2020. (Year: 2020).

Zhou, Yanghong, P. Y. Mok, and Shijie Zhou. "A Part-Based Deep Neural Network Cascade Model for Human Parsing." IEEE Access 7, 2019, 160101-160111. (Year: 2019).

China National Intellectual Property Administration, First Office Action, Application No. 202180012955.7, English Translation, dated Dec. 28, 2022, 3 pages, China.

China National Intellectual Property Administration, First Office Action, Application No. 202180012955.7, English Translation, dated Dec. 28, 2022, 10 pages, China.

\* cited by examiner

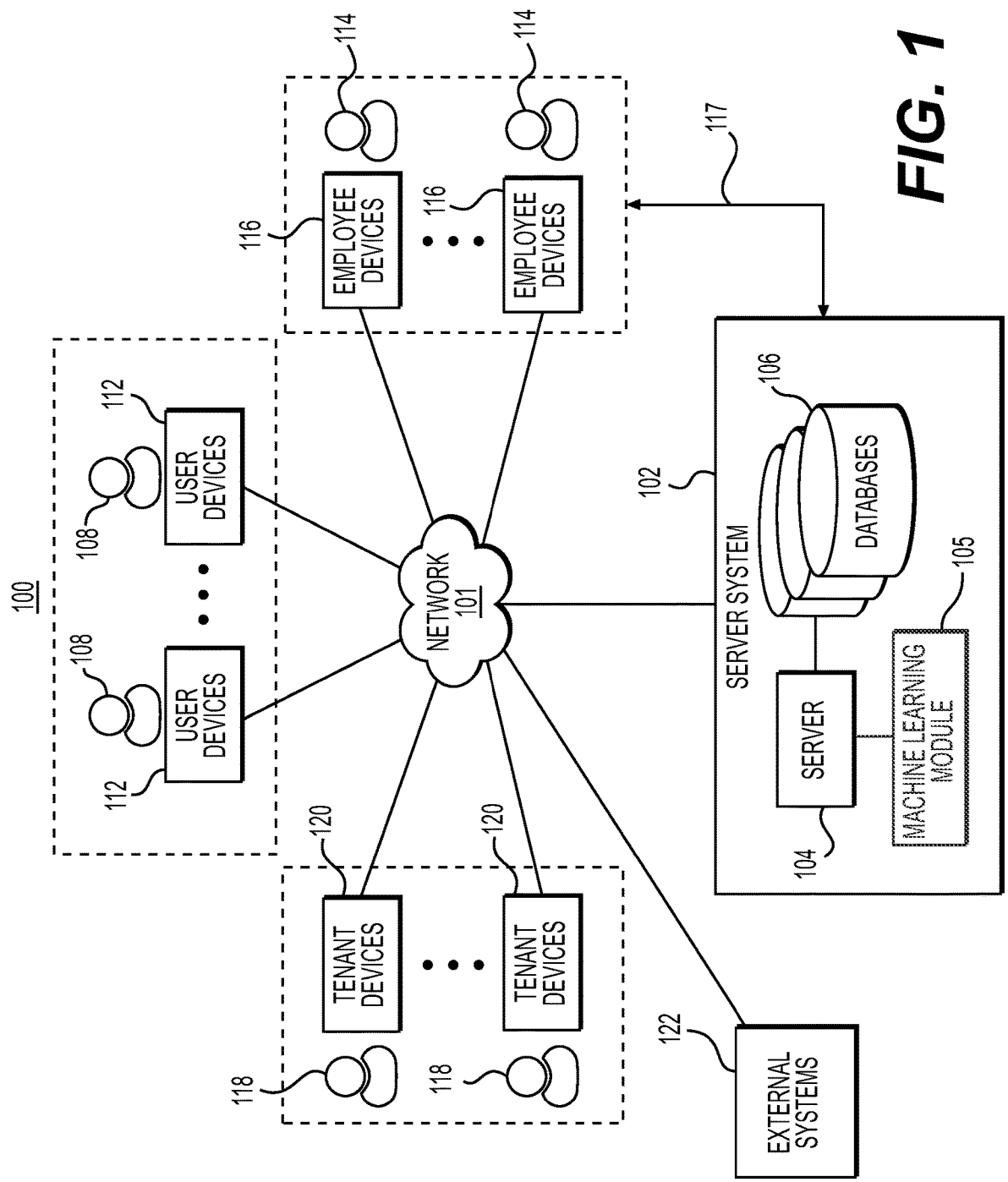

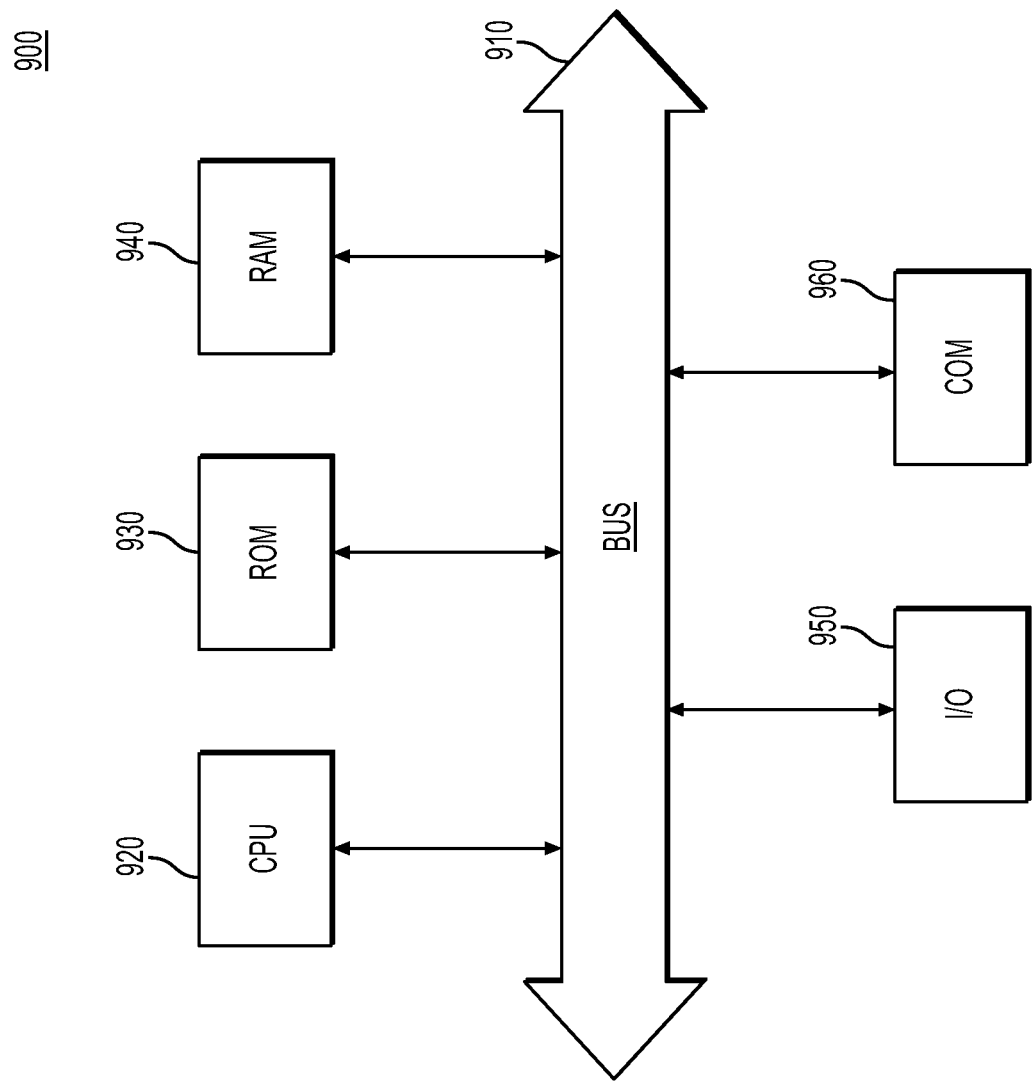

SYSTEMS AND METHODS FOR PRODUCT IDENTIFICATION USING IMAGE ANALYSIS AND TRAINED NEURAL NETWORK

CROSS-REFERENCE TO RELATED APPLICATION(S)

This patent application is a continuation of and claims the benefit of priority to U.S. Nonprovisional patent application Ser. No. 16/947,142, filed Jul. 20, 2020, which is a continuation of U.S. Nonprovisional application Ser. No. 16/783,289, filed Feb. 6, 2020, now U.S. Pat. No. 10,769,198, which are incorporated by reference in their entireties herein.

TECHNICAL FIELD

Various embodiments of the present disclosure generally relate to image processing, and more particularly, to identifying and analyzing products depicted in an image, for example, in the context of an electronic clothing subscription or other e-commerce platform.

BACKGROUND

Fashion and apparel style management poses several challenges for wearable item rental subscription services. For example, one such challenge involves traditional processes of assortment planning and buying decisions for clothing rental subscription services, which may be error prone and labor intensive. Another challenge is that subscribers to clothing rental subscription services need to look for styles they are willing to try out. Subscribers may look for styles using online search, recommendation, and collection browsing on style feature taxonomies. Subscribers often find it difficult to describe their constantly changing fashion preferences, and time consuming to discover interesting styles through service catalogs. Yet another challenge is that wearable item rental subscription services have to ensure that the wearable items offered through the clothing rental subscription services are always identified correctly in warehouses for circulating, cleaning, hanging, packing and shipping in the life cycles of the subscription service. It is not uncommon for a label and/or barcode associated with a wearable item to get lost when a user ships the wearable item back after wearing it or when it is cleaned in a warehouse. It is labor intensive to sort through a product catalog in order to match and find that particular wearable item in the system. This process sometimes fails because the process may be too time consuming. Therefore, the wearable item may be retired in the warehouse, causing an inventory loss.

Accordingly, there is a need for an approach utilizing visual recognition and image search to overcome some of the challenges described above.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for identification and analysis of products depicted in images to overcome the problems with conventional methods noted above.

In one embodiment, a computer-implemented method comprises: obtaining, by one or more processors, a first set of images, wherein each of the first set of images depicts a product; obtaining, by the one or more processors, a first set of labels associated with the first set of images, wherein each of the first set of labels corresponds to an image in the first set of images and includes information indicating a mask of the product depicted in the corresponding image; training, by the one or more processors, an image segmentation neural network based on the first set of images and the first set of labels; obtaining, by the one or more processors, a second set of images, wherein each of the second set of images depicts a known product; obtaining, by the one or more processors, a second set of labels associated with the second set of images, wherein each of the second set of labels corresponds to an image in the second set of images and includes information indicating classification information for the known product depicted in the corresponding image; training, by the one or more processors, an image classification neural network based on the second set of predetermined images and the second set of labels; receiving, by the one or more processors, a query image depicting a product that is not yet identified; performing, by the one or more processors, image segmentation of the query image using the image segmentation neural network, wherein performing image segmentation of the query image includes removing background image portions of the query image, thereby obtaining a mask image of the product depicted in the query image; and identifying the product in the image by performing, by the one or more processors, image analysis of the mask image of the product depicted in the query image using the image classification neural network.

In another embodiment, a computer system comprises: a data storage device storing processor-readable instructions; and a processor configured to execute the instructions to perform a method. The method may include obtaining a first set of images, wherein each of the first set of images depicts a product; obtaining a first set of labels associated with the first set of images, wherein each of the first set of labels corresponds to an image in the first set of images and includes information indicating a mask of the product depicted in the corresponding image; training an image segmentation neural network based on the first set of images and the first set of labels; obtaining a second set of images, wherein each of the second set of images depicts a known product; obtaining a second set of labels associated with the second set of images, wherein each of the second set of labels corresponds to an image in the second set of images and includes information indicating classification information for the known product depicted in the corresponding image; training an image classification neural network based on the second set of predetermined images and the second set of labels; receiving a query image depicting a product that is not yet identified; performing image segmentation of the query image using the image segmentation neural network, wherein performing image segmentation of the query image includes removing background image portions of the query image, thereby obtaining a mask image of the product depicted in the query image; and identifying the product in the image by performing image analysis of the mask image of the product depicted in the query image using the image classification neural network.

In another embodiment, there is provided a non-transitory computer-readable medium containing instructions that, when executed by a processor, cause the processor to perform a method. The method may include obtaining a first set of images, wherein each of the first set of images depicts a product; obtaining a first set of labels associated with the first set of images, wherein each of the first set of labels corresponds to an image in the first set of images and includes information indicating a mask of the product depicted in the corresponding image; training an image segmentation neural network based on the first set of images and the first set of labels; obtaining a second set of images, wherein each of the second set of images depicts a known product; obtaining a second set of labels associated with the second set of images, wherein each of the second set of labels corresponds to an image in the second set of images and includes information indicating classification information for the known product depicted in the corresponding image; training an image classification neural network based on the second set of predetermined images and the second set of labels; receiving a query image depicting a product that is not yet identified; performing image segmentation of the query image using the image segmentation neural network, wherein performing image segmentation of the query image includes removing background image portions of the query image, thereby obtaining a mask image of the product depicted in the query image; and identifying the product in the image by performing image analysis of the mask image of the product depicted in the query image using the image classification neural network.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1 depicts an example environment in which methods, systems, and other aspects of the present disclosure may be implemented.

FIG. 9 depicts an exemplary computer device or system, in which embodiments of the present disclosure, or portions thereof, may be implemented.

DETAILED DESCRIPTION OF EMBODIMENTS

Figures 2A, 2B:
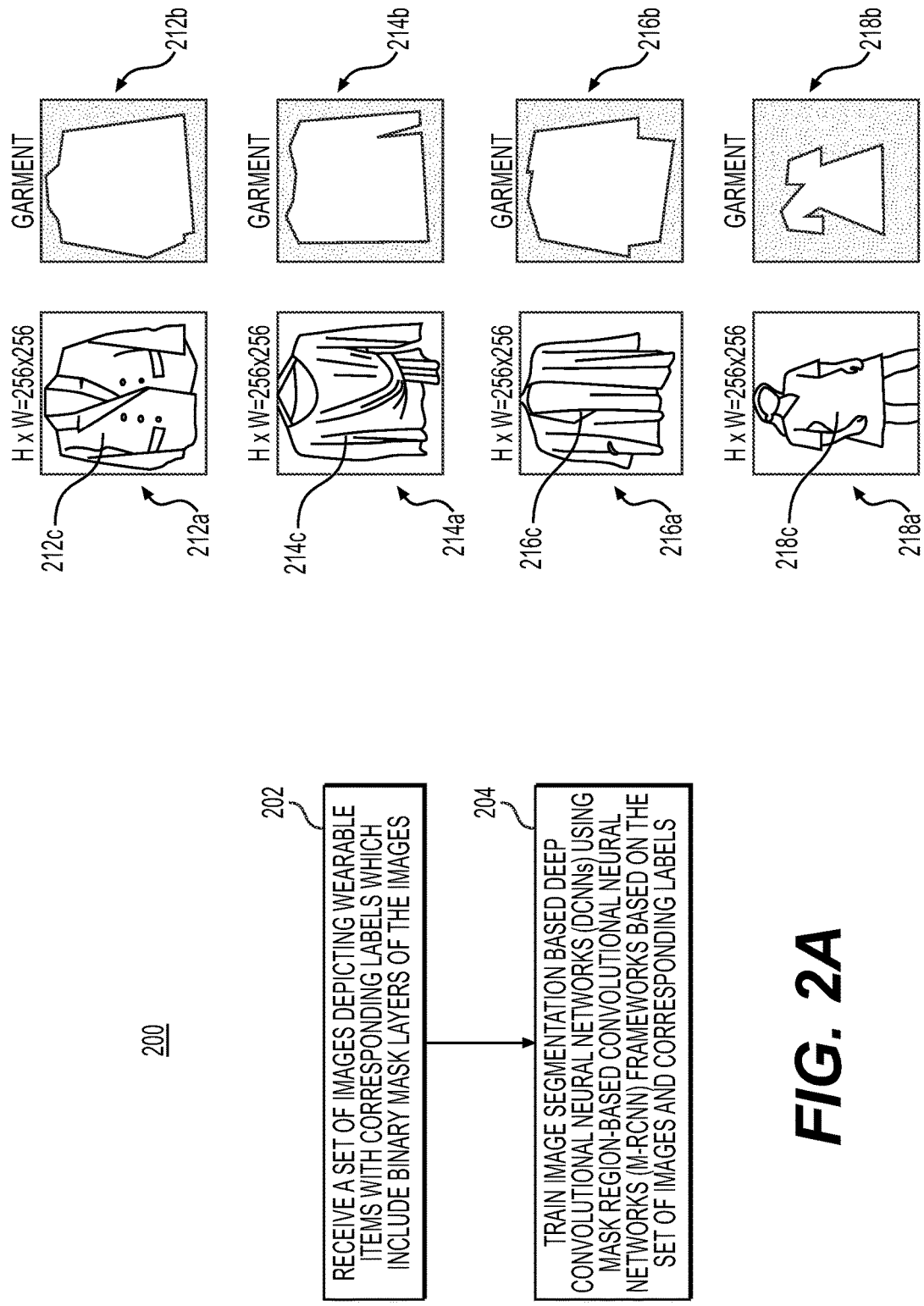
FIG. 2A depicts an exemplary process for training one or more image segmentation based neural networks, according to some embodiments.
FIG. 2B depicts an exemplary set of images depicting wearable items with corresponding masks, according to some embodiments.

As described above, there is a need for an approach utilizing visual recognition and image search to overcome some of the challenges described above in the context of a wearable item subscription service or other e-commerce application. Therefore, the embodiments disclosed herein provide visual recognition solutions using deep convolutional neural network and computer vision techniques enabling general visual recognition and image search of products within images.

Conventional neural network based image classification, however, may be subject to the influence of background noise, thereby reducing the accuracy of image classification. In addition, although conventional neural network frameworks built for image segmentation may be capable of differentiating background from foreground, conventional neural network frameworks have limited capacity for image classification. The embodiments disclosed herein are directed to the integration of image segmentation neural networks with image classification neural networks to provide a human level accuracy of object classification task regardless of background noise from any received images. In some embodiments, the integrated image segmentation neural networks and image classification neural networks may provide enhanced object recognition by automatically removing background noises from the received images.

Some methods of wearable item image analysis disclosed herein may employ neural network approaches (i.e., "deep learning"). A neural network may be software representing the human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network. In some embodiments, the neural network may include deep convolutional neural networks (DCNN) and/or region based convolutional neural networks (R-CNN). Some exemplary R-CNNs may include R-CNN, Fast R-CNN, Faster R-CNN, and/or Mask R-CNN. R-CNNs may include one or more convolutional neural network models designed for object detection within an image. DCNNs may be configured to analyze visual imagery, for example, for analyzing, classifying, and identifying one or more products within an image depicting the one or more products.

In some embodiments, the neural network may comprise one or more image segmentation based neural networks and one or more image classification based neural networks, as will be described in further detail below. In some embodiments, the one or more image segmentation based neural networks may comprise one or more mask region based convolutional neural networks (M-RCNNs). In the context of the current disclosure, one or more DCNNs trained and/or tested based on M-RCNN frameworks may be referred to as image segmentation based DCNNs. The one or more neural networks disclosed herein may be trained by supervised, unsupervised or semi-supervised learning using training sets comprising data of types similar to the type of data used as the model input. In some embodiments, the one or more neural networks, as described herein, may be trained by supervised learning. For example, the training set used to train the disclosed one or more neural networks will be described in further detail below with reference to FIGS. 2A, 2B, and 3.

In some embodiments, model training and model inference may be implemented in the following three steps. First, one or more image segmentation based neural networks may be trained to learn a mask of foreground at a pixel level. In some embodiments, product images of wearable items provided by subscription services and/or images taken by merchandisers may be used for mask labeling. In some embodiments, a portion (e.g., 80%) of the images may be used for training the one or more image segmentation-based neural networks, and a remaining portion (e.g., 20%) of the images may be utilized for testing the one or more image segmentation-based neural networks. The trained one or more image segmentation-based neural networks may generate masks which may allow for background removal of any image depicting wearable items, leaving only foreground objects of interest, e.g., the wearable items. Second, one or more image classification based neural networks may be trained using the clean background images (e.g., the images with only the foreground objects of interest with the background removed), thereby learning to classify various product categories, patterns, and colors and producing a learned embedded space of the objects. In the context of the current disclosure, an embedded space may refer to a multi-dimensional tensor space, which may learn to encode certain properties using distances. In the context of image analysis, trained neural network models may convert input image pixels to a tensor of numbers, e.g., similar images may have similar distances. Third, the one or more image classification based neural networks may be inferred to search for images depicting similar wearable items from the database, as result of receiving a query image depicting a wearable item and where the background of the query image has been removed using the trained image segmentation based neural network. In some embodiments, the one or more image classification based neural networks may rank the similar wearable items based on a similarity to the depicted wearable item. For example, a similarity score may be determined for the similar wearable items and the similar wearable items may be ranked based on the each determined similarity score. In some embodiments, the similarity score may be based on a pattern spatial frequency, hue, saturation, and lightness from patches of the similar wearable items and the wearable item depicted in the query image. For example, various embodiments of determining similarity scores based on a pattern spatial frequency, hue, saturation, and lightness are disclosed, for example, in U.S. patent application Ser. No. 16/417,862 (hereinafter referred to as the '862 application), filed May 21, 2019, entitled "Systems and Methods for Color and Pattern Analysis of Images of Wearable Items," which is incorporated herein by reference in its entirety.

In some embodiments, there is provided a method and system that may obtain patched image information of spatial frequency of patterns, hue, saturation, and lightness in addition to the integrated neural networks of image segmentation and image classification in order to improve accuracy of object recognition. For example, various embodiments of obtaining patched image information of spatial frequency of patterns, hue, saturation, and lightness are disclosed, for example, in the '862 application. In some embodiments, there are provided methods and systems that may train neural networks and models using product catalog images including human models and wearable items. In such embodiments, the methods and systems may provide style search functions for users, merchandisers, and/or warehouse employees.

The embodiments disclosed herein may provide at least the following: (1) rapid fashion styles search for subscribers of wearable item subscription services; (2) assisting merchandizers with buying and planning processes by identifying similar styles in the inventory; and (3) reducing inventory loss by visual search missing barcodes label garments.

For the first application regarding the rapid fashion styles search for subscribers, a subscriber may submit an image depicting a wearable item of interest. The embodiments disclosed herein describe receiving the image, removing the background of the image, and generating some similar styles for the subscriber to add to her/his virtual wardrobe. In some embodiments, the top ten similar styles may be provided for the subscriber.

For the second application regarding assisting merchandisers, a merchandiser, who may be responsible for the buying and planning for wearable items subscription services, may leverage the embodiments disclosed herein to search for existing inventory and identify statistical distributions of similar styles for any given query image depicting a wearable item.

For the third application regarding reducing inventory loss by visual search missing barcodes label garments, an employee in a warehouse may use a camera on a user device to take an image of a wearable item with missing labels. The embodiments disclosed herein describe receiving the image, and identifying similar wearable items. In some embodiments, the similar images may be generated based on a similarity score inferred from the one or more neural networks disclosed herein. In some embodiments, the identified similar wearable items may be fine-tuned and reordered using the patch from the input image, accounting for the pattern spatial frequency, hue, saturation, and lightness. For example, various embodiments of identifying similar wearable items using the patch from the image are disclosed, for example, in the '862 application. The employee may be able to decide which of the identified similar wearable items is the wearable item depicted in the image. The employee may then reproduce a label for the wearable item and properly store the wearable item for future use.

Accordingly, the embodiments disclosed herein may be applied to consumer experiences, merchandising planning, and/or warehouse logistics and provide the significant advantages of: (1) allowing rapid fashion styles search for subscribers of wearable item subscription services, thereby enhancing the user experience (e.g., a closeting helper search); (2) assisting merchandisers to accelerate buying and planning processes by providing information of similar styles in the inventory (e.g., a merchandiser tool); and (3) identifying label garments for wearable items missing label garments in a warehouse (e.g. a warehouse and/or back office tool). The embodiments disclosed herein may provide preferable user experience and business efficiencies throughout the life cycles of the wearable item subscription services.

While the exemplary system architecture as described in the present disclosure relates to an electronic transaction platform for managing, subscribing to, purchasing, or renting wearable items (e.g., clothing-as-a-service (CaaS) or Try-Then-Buy (TTB) service), implementations disclosed herein may effectively serve various other online transaction platforms in the context of any other subscription, purchase, rental, or retail services without departing from the scope of the disclosure. In addition, while some descriptions and examples disclosed in the present disclosure refer to certain exemplary transaction platforms or inventories as transactions or inventories pertaining to "apparel," "garments," or "CaaS" (i.e., clothing-as-a-service), all of those transactions and/or inventories may effectively serve any consumer product or wearable item (e.g., an article of clothing, apparel, jewelry, hat, accessories, or any other product which may be worn), or even hospitality linens, consumer goods, or any other textile fabrics, without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the term "wearable item" may refer to any article of clothing, apparel, jewelry, hat, accessories, or other product which may be worn by a person, an animal, or a thing, or be used as an ornament for a person, an animal, or a thing.

In accordance with the present disclosure, user interfaces, periodically executed computer-implemented services, ad hoc services, and automations being integrated together in a connected platform may be achieved by a uniquely configured system architecture, job execution cluster configuring one or more processors to perform both storefront and back office tasks, and various user interfaces providing specialized or customized access to users of different roles. The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an example environment 100, according to one or more embodiments of the present disclosure. As shown, the example environment 100 may include one or more networks 101 that interconnect a server system 102, user devices 112, employee devices 116, tenant devices 120, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and tenant devices 120 may be accessed by employees of tenant entities 118. In some implementations, employee devices 116 may be used to perform the functions of the tenant devices 120 and/or the user devices 112. Server system 102 may comprise one or more servers 104 and one or more databases 106, which may be configured to store and/or process a plurality of data, microservices, and service components, and/or associated functions thereof. In some embodiments, the server system 102 may comprise a machine learning module 105. The one or more servers 104 may comprise the machine learning module 105 in some embodiments. The machine learning module 105 may comprise one or more neural networks. In some embodiments, the one or more neural networks may include deep convolutional neural networks (DCNN) and/or region based convolutional neural networks (R-CNN). R-CNNs may include one or more convolutional neural network models designed for object detection within an image. DCNNs may be configured to analyze visual imagery, for example, for analyzing, classifying, and identifying one or more products within an image depicting the one or more products. In some embodiments, the one or more neural networks may comprise one or more image segmentation based neural networks and one or more image classification based neural networks, as will be described in further detail below.

Users 108 may access the server system 102 through the one or more networks 101 using user devices 112. Each device among the user devices 112 may be any type of computing device (e.g., personal computing device, mobile computing devices, etc.) which allows users 108 to display a web browser or a web based application for accessing the server system 102 through the network 101. The user devices 112 may, for example, be configured to display a web browser, a web based application, or any other user interface (e.g., one or more mobile applications) for allowing users 108 to exchange information with other device(s) or system(s) in the environment 100 over the one or more networks 101. For example, a device among the user devices 110 may load an application with a graphical user interface (GUI), and the application may display on the GUI one or more apparel recommendations for closeting by the user. Users 108 accessing user devices 112 may be, for example, users and/or potential users of apparel made available for subscription based distribution via electronic transactions and physical shipment. Additionally, or alternatively, users 108 may access user devices 112 to, for example, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, customer service employees, marketer employees, warehouse employees, analytics employees, or any other employees who are authorized and/or authenticated to perform tasks, operations, and/or transactions associated with the server system 102, and/or the external systems 122. In one embodiment, employee devices 116 are owned and operated by the same entity or at least an affiliate of the entity operating the e-commerce (e.g., CaaS) business hosted on server systems 102. Each device among the employee devices 116 may be any type of computing device (e.g., personal computing device, mobile computing devices, etc.). The employee devices 116 may allow employees 114 to display a web browser or an application for accessing the server system 102 and/or the external systems 122, through the one or more networks 101. For example, a device among the one or more of the employee devices 116 may load an application with graphical user interface (GUI), and the application may display on the GUI one or more warehouse operations associated with providing CaaS to users 108. In some implementations, the employee devices 116 may communicate directly with the server system 102 via communications link 117 bypassing public networks 101. Additionally, or alternatively, the employee devices 116 may communicate with the server system 102 via network 101 (e.g., access by web browsers or web based applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity that allocates and/or supplies one or more specific collections of apparel for the CaaS inventory. For example, each of the one or more tenants 118 may be a retailer, a designer, a manufacturer, a merchandiser, or a brand owner entity that supplies one or more collections of wearable items to the CaaS inventory managed and/or accessed by the server system 102. Tenants 118 may use one or more electronic tenant interfaces (e.g., a catalog content management system associated with each tenant) to provide the server system 102 with wearable item data that describe apparel or wearable items made available for electronic transactions on server system 102. For example, one or more catalogs for each of the one or more tenants 118 may be generated and/or updated at the server system 102 dynamically and/or periodically. Tenant devices 120 may serve as access terminals for the tenants 118, for communicating with the electronic tenant interfaces and/or other subsystems hosted at the server system 102. The tenant devices 120 may, for example, be configured to display a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

As indicated above, FIG. 1 is provided merely as an example. Other examples that differ from the example environment 100 of FIG. 1 are contemplated within the scope of the present embodiments. In addition, the number and arrangement of devices and networks shown in environment 100 are provided as an example. In practice, there may be additional devices, fewer devices and/or networks, different devices and/or networks, or differently arranged devices and/or networks than those shown in environment 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

FIG. 2A depicts a diagram showing an exemplary process 200 for training one or more image segmentation based neural networks, according to some embodiments. In some embodiments, the process 200 may be performed by the server system 102. For example, the one or more servers 104 and/or the machine learning module 105, as described above with reference to FIG. 1, may be configured to perform the exemplary process 200 depicted in FIG. 2. In some embodiments, the one or more servers 104 and/or the machine learning module 105 may include one or more neural networks such as one or more image segmentation based deep convolutional neural networks (DCNNs) and one or more image classification based DCNNs.

In step 202, a set of images depicting wearable items with corresponding labels may be received. In some embodiments, the corresponding labels may depict binary mask layers of the images. FIG. 2B illustrates an exemplary embodiment of a set of images 212a, 214a, 216a, 218a depicting wearable items 212c, 214c, 216c, 218c with corresponding labels which may include binary mask layers 212b, 214b, 216b, 218b of the images. As shown in FIG. 2B, each of the images may comprise a height by width of 256 pixels by 256 pixels. It is understood that each of the images may comprise various heights by width in alternative embodiments. As shown in FIG. 2B, each of the binary mask layers 212*b*, 214*b*, 216*b*, 218*b* of the images may depict an image of the wearable items 212*c*, 214*c*, 216*c*, 218*c* with the background removed.

Referring back to FIG. 2A, in step 204, the one or more image segmentation based deep convolutional neural networks (DCNNs) may be trained using mask region based convolutional neural networks (M-RCNN) frameworks based on the binary mask layers 212*b*, 214*b*, 216*b*, 218*b*. In some embodiments, the one or more trained image segmentation based DCNNs may remove the background portions of any received images depicting wearable items in order to obtain just the wearable items, i.e., the foreground wearable items with the background removed. In the context of the current disclosure, the obtained wearable item images, i.e., the foreground of the received images, may be referred to as a mask image of the received images.

Figure 3:
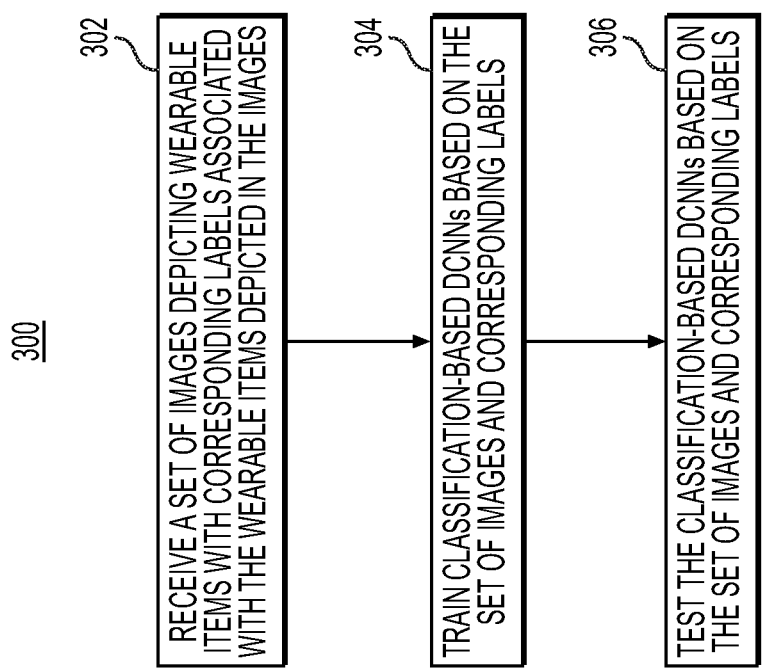
FIG. 3 depicts a diagram showing an exemplary process for training one or more classification based neural networks, according to some embodiments.

FIG. 3 depicts a diagram showing an exemplary process 300 for training one or more image classification based neural networks, according to some embodiments. In some embodiments, the process 300 may be performed by the server system 102. For example, the one or more servers 104 and/or the machine learning module 105, as described above with reference to FIG. 1, may be configured to perform the exemplary process 300 depicted in FIG. 3.

In step 302, a set of images depicting wearable items with corresponding labels may be received. In some embodiments, the corresponding labels may include one or more of product category, pattern, colors, hemline length, neckline shape, sleeve length, etc. associated with the wearable items depicted in the set of images. For example, the set of images may depict various types of dress shirts. Accordingly, the corresponding labels may include product category information (e.g., an indication that each of the images are related to one or more dress shirts), pattern (e.g., an indication regarding the pattern of each of the depicted dress shirts such as strips, solids, etc.), and color (e.g., an indication regarding the color of each of the depicted dress shirts). In step 304, the one or more image classification based DCNNs may be trained based on the input set of images and corresponding labels. Accordingly, the one or more image classification based DCNNs may be trained to identify a wearable item depicted in an image. For example, the one or more image classification based DCNNs may be configured to identify that a pink polka dot dress shirt is depicted in a received image. In some embodiments, process 300 may include a further step 306 in which the one or more image classification based DCNNs may be tested based on the received set of images and corresponding labels to determine the accuracy and efficiency of the one or more image classification based DCNNs.

Figure 4:
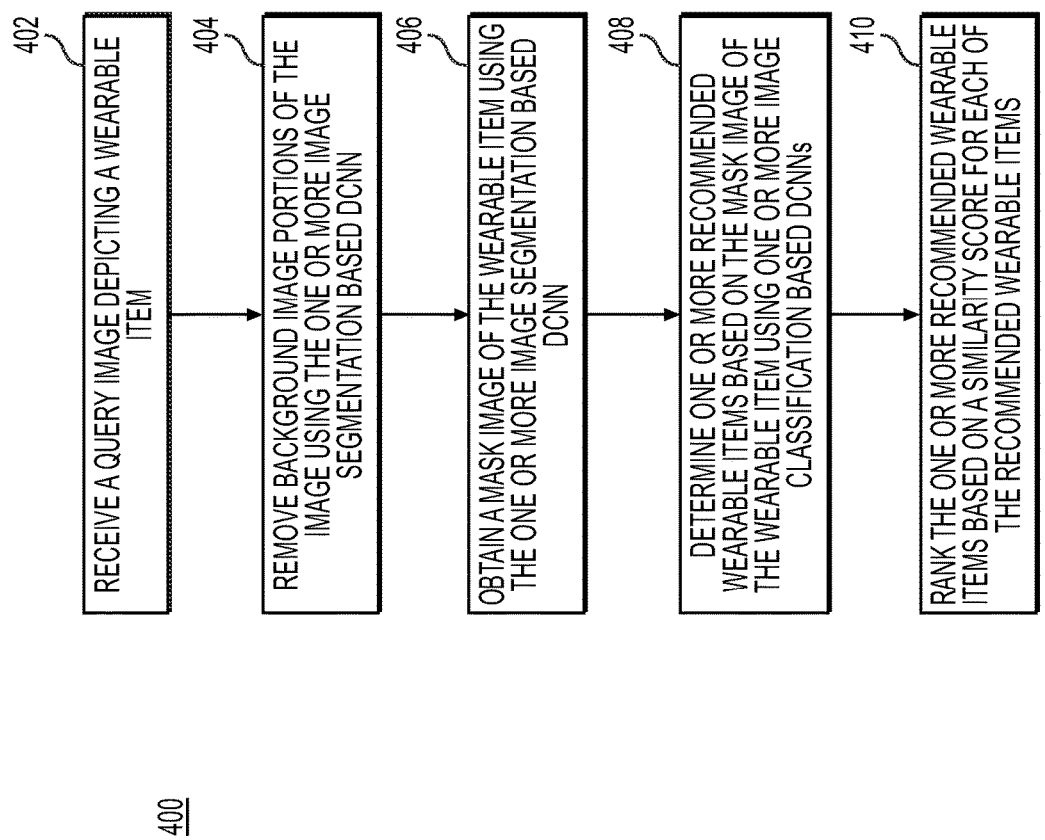
FIG. 4 depicts a diagram showing an exemplary process for determining one or more identified or recommended wearable items based on an analysis of an image depicting a wearable item, according to some embodiments.

FIG. 4 depicts a diagram showing an exemplary process 400 for determining one or more identified or recommended wearable items based on an analysis of an image depicting a wearable item, according to some embodiments. In some embodiments, the process 400 may be performed by the server system 102. For example, the one or more servers 104 and/or the machine learning module 105, as described above with reference to FIG. 1, may be configured to perform the exemplary process 400 depicted in FIG. 4. In some embodiments, the one or more servers 104 and/or the machine learning module 105 may include one or more neural networks such as one or more image segmentation based DCNNs and the one or more image classification based DCNNs. In some embodiments, the one or more image segmentation based DCNNs and the one or more image classification based DCNNs may be trained and/or tested as described above with reference to FIGS. 2 and 3.

In step 402, a query image depicting a wearable item may be received. In step 404, background image portions of the image may be removed using the one or more image segmentation based DCNNs. In some embodiments, the background image portions of the query image may be removed based on M-RCNN frameworks. In step 406, a mask image of the depicted wearable item may be obtained based on the query image with the background portions removed using the one or more image segmentation based DCNNs. In some embodiments, the mask image of the depicted wearable item may be obtained based on one the one or more M-RCNNs.

In step 408, one or more identified or recommended wearable items may be determined using the one or more image classification based DCNNs based on the mask image of the wearable item. For example, the one or more image classification based DCNNs may be used to determine one or more classifications of the wearable item depicted in the mask image. Specifically, the wearable item may be classified as a dress shirt with a solid red color in some instances. One or more wearable items included in the one or more collections of wearable items in the CaaS inventory managed and/or accessed by the server system 102 may be identified or recommended based on the classified wearable item, e.g., the red dress shirt. For example, the one or more identified or recommended wearable items may include a variety of dress shirts with a red color and/or pattern. In some embodiments, one or more identified or recommended wearable items may be determined based on the determined classifications (e.g., dress shirt, red color, no pattern, etc.) for the wearable item depicted in the mask image.

Figure 5:
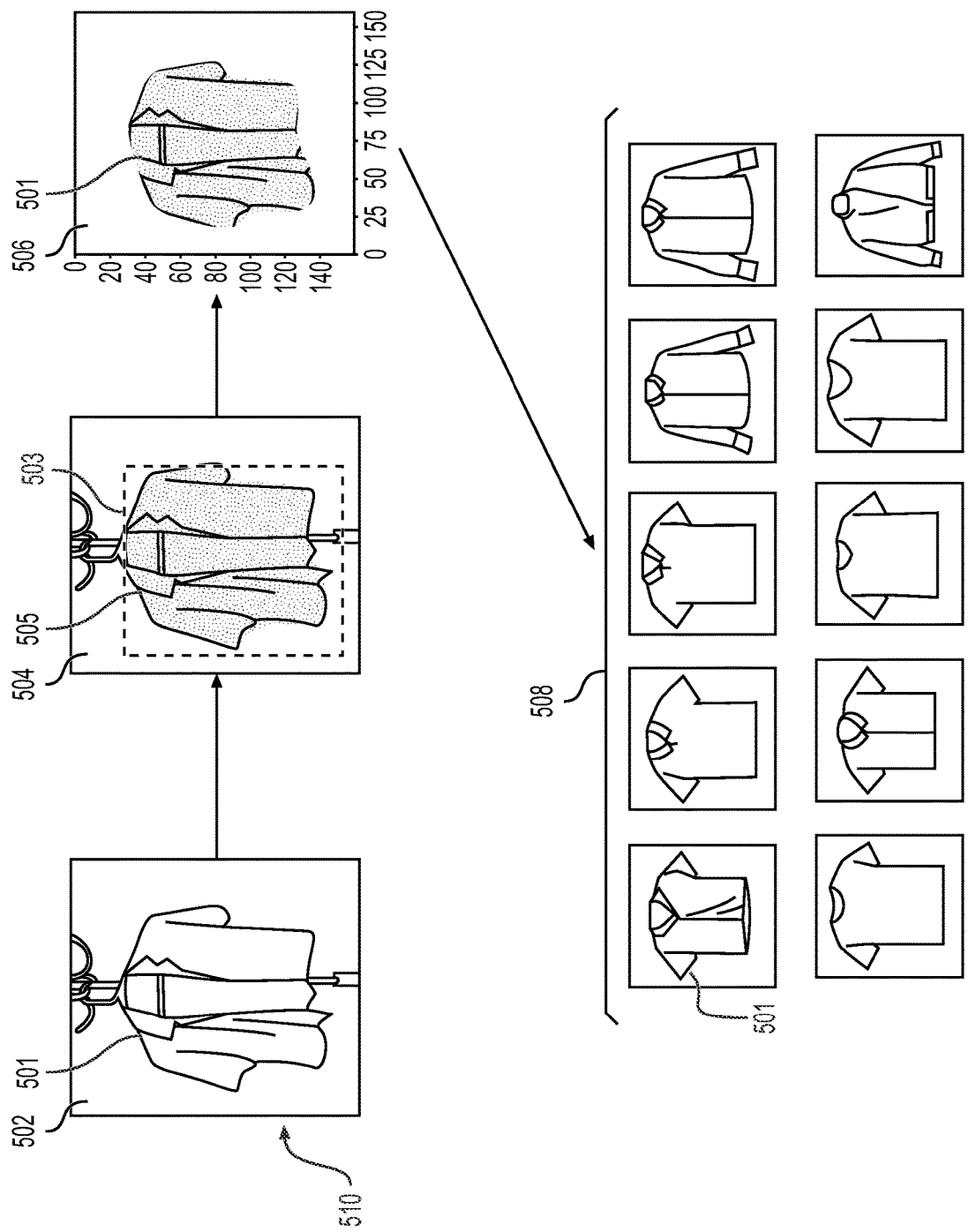
FIG. 5 depicts an exemplary process for identifying one or more products based on an analysis of an image depicting the product, according to some embodiments.
Figure 6:
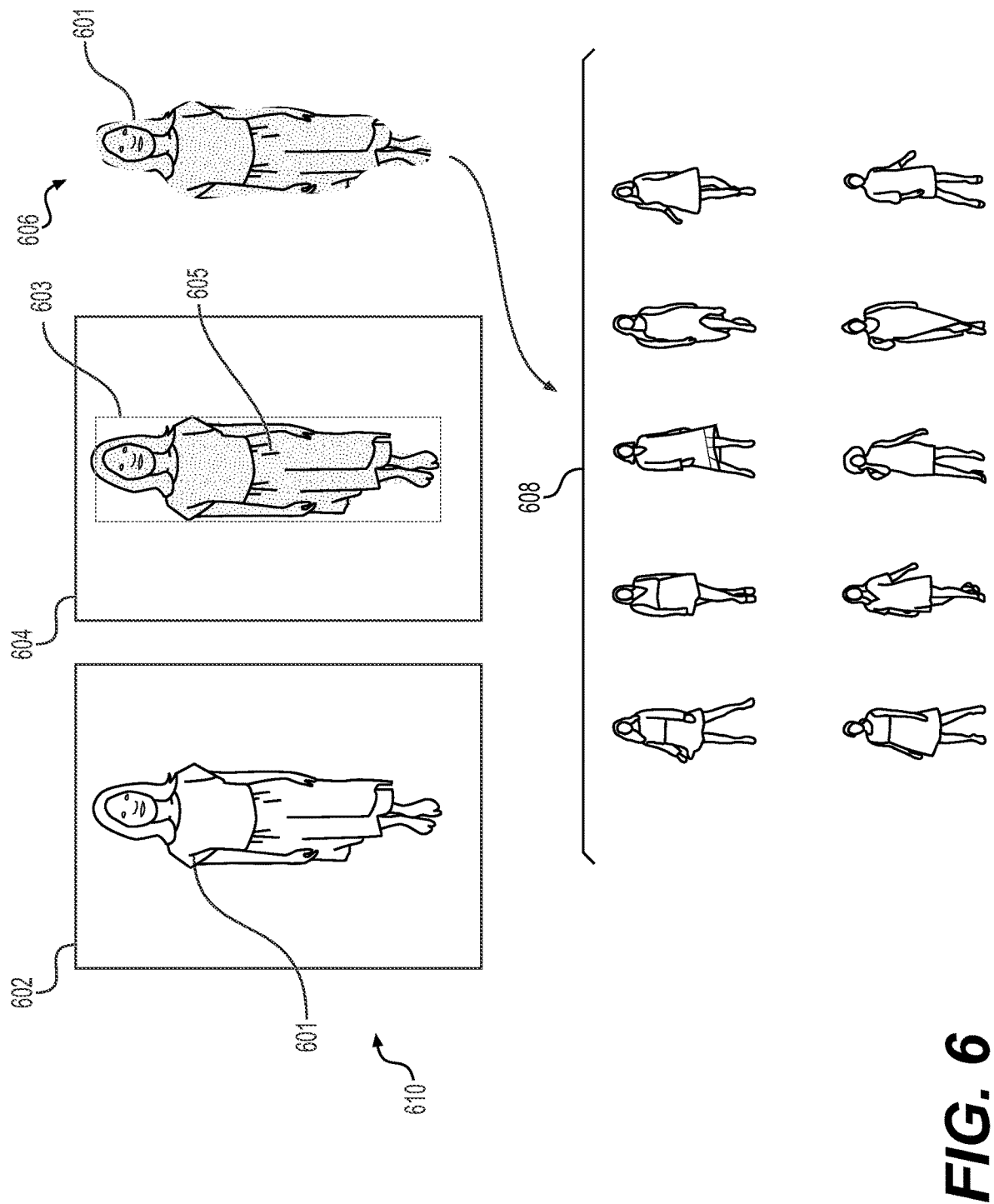
FIG. 6 depicts an exemplary process for identifying one or more products within an image based on an analysis of an image depicting the one or more products, according to some embodiments.

In step 410, the one or more identified or recommended wearable items may be ranked based on a similarity score for each of the identified or recommended wearable items. In some embodiments, the server system 102 may determine a similarity score between the one or more identified or recommended wearable items and the wearable item depicted in the mask image. In some embodiments, a mask image of the wearable item depicted in the query image may be classified by the one or more image classification based DCNNs according to an appropriate size dimension in height, width, and/or channels. Accordingly, the mask image may be mapped into corresponding coordinates in an embedded space. In some embodiments, such mapping may be included in a last layer of the one or more neural networks described herein. The similarity score may be determined based on an appropriate distance metric between the query mask image and one or more identified and/or recommended wearable items (e.g., as shown in FIGS. 5 and 6). In some embodiments, a smaller distance between the images may indicate a higher resemblance. Accordingly, images with relatively smaller distances may be assigned relatively higher similarity scores. In some embodiments, the one or more identified or recommended wearable items may be ranked based on the determined one or more identified or recommended wearable items. For example, the one or more identified or recommended wearable items may be ranked from highest similarity score in descending order. In some embodiments, a plurality of the top ranked identified or recommended wearable items may be displayed to a user. For example, the identified or recommended wearable items with the top ten similarity scores may be displayed to the user. In some embodiments, the ranked identified or recommended wearable items may be reordered, i.e., re-ranked, based on a pattern spatial frequency, hue, saturation, and lightness from patches of the one or more identified or recommended wearable items and the wearable item depicted in the query image. For example, various embodiments of determining similarity based on a pattern spatial frequency, hue, saturation, and lightness are disclosed, for example, in the '862 application.

FIGS. 5 and 6 depict exemplary processes 500, 600 for identifying one or more products, e.g., wearable items, based on an analysis of a query image depicting a product, e.g., a wearable item, according to some embodiments. In some embodiments, processes 500, 600 may be performed by the server system 102. For example, the one or more servers 104 and/or the machine learning module 105, as described above with reference to FIG. 1, may be configured to perform the exemplary processes 500, 600 depicted in FIGS. 5 and 6.

As shown in FIG. 5, process 500 may begin with step 502 in which a query image 510 depicting a wearable item 501 may be received. In step 502, the one or more image segmentation based DCNNs may extract one or more feature maps from the query image 510. A Region Proposal Network (RPN) may determine whether an object is present or not in the extracted one or more feature maps. Accordingly, the RPN may determine one or more regions within the query image 510 which the RPN predicts that an object is present based on the extracted one or more feature maps. In some embodiments, the RPN may be included in the machine learning module 105, e.g., in the one or more image segmentation based DCNNs. For example, the RPN may be included in the one or more M-RCNNs. The one or more image segmentation based DCNNs may then apply a Region of Interest (RoI) pooling layer to the one or more regions to convert the determined one or more regions to a same shape, e.g., bounding boxes. In some embodiments, the one or more image segmentation based DCNNs may classify an object within the bounding boxes. The one or more image segmentation based DCNNs may determine a mask image of the object (also referred to as a segmentation mask) within the bounding boxes. For example, as shown in FIG. 5, the one or more image segmentation based DCNNs may determine a bounding box 503 containing the wearable item 501 depicted in the query image 510. The one or more image segmentation based DCNNs may further determine a mask image 505 of the wearable item 501, as shown in FIG. 5.

In step 506, the one or more image segmentation based DCNNs may determine that the portions of the query image 510 around the mask image 505 are background portions and remove the background portions to obtain just the wearable item 501. In step 508, one or more wearable items may be identified using the one or more image classification based DCNNs based on the wearable item 501, e.g., the mask image 505 of the wearable item 501, obtained in step 506. For example, the one or more image classification based DCNNs may be used to determine one or more classifications associated with the depicted wearable item 501 and one or more wearable items may be identified based on the wearable item 501, e.g., the determined classifications of the depicted wearable item 501, as described above with reference to step 410 of FIG. 4. In some embodiments, the one or more identified wearable items may include the wearable item 501 depicted in the query image 510. In some instances, a warehouse employee may submit the query image 510 depicting the wearable item 501 to recover a label and/or information for the wearable item 501. In such instances, the warehouse employee may be displayed with one or more identified items including the wearable item 501. Accordingly, the warehouse employee may obtain information, such as product identifier number, etc., related to the wearable item 501. It is understood that the warehouse employee example is provided solely for illustration of an exemplary application of the process 500, and the process 500 in addition to the remaining embodiments disclosed herein may be applied to various alternative situations and environments.

FIG. 6 depicts an exemplary process 600 for identifying one or more products, e.g., wearable items, based on an analysis of an image depicting a product, e.g., a wearable item, according to some embodiments.

As shown in FIG. 6, process 600 may begin with step 602 in which a query image 610 depicting a person wearing wearable item 601 may be received. In step 604, the one or more image segmentation based DCNNs may extract one or more feature maps from the query image 610. As described above with reference to FIG. 5, an RPN may determine whether an object is present or not in one or more regions based on the extracted one or more feature maps. The one or more image segmentation based DCNNs may then apply an RoI pooling layer to the one or more regions to convert the determined one or more regions to a same shape, e.g., bounding boxes. In some embodiments, the one or more image classification based DCNNs may classify an object within the bounding boxes. For example, the one or more image classification based DCNNs may label each bounding box (e.g., bounding box 603) based on the determined classification, e.g., a person (e.g., person wearing the depicted wearable item 601), as shown in step 604 of FIG. 6. In some embodiments, the one or more image classification based DCNNs may include a prediction confidence for each indicated classification for the object within a bounding box. For example, the one or more image classification based DCNNs may indicate that the classification for the person wearing the depicted wearable item 601 as a person has an associated prediction confidence of 1.000 (i.e., 100%). In some embodiments, the label and prediction confidence may be indicated on a top left corner of each bounding box.

The one or more image segmentation based DCNNs may determine a mask image of the object (also referred to as a segmentation mask) within the bounding boxes. For example, as shown in FIG. 6, the one or more image segmentation based DCNNs may determine the bounding box 603 containing the person wearing the wearable item 601 and further determine a mask image 605 of the person wearing the wearable item 601, as shown in FIG. 6. In some embodiments, the query image may include two or more people and/or other objects such as cars, handbags, etc. In such embodiments, the one or more image segmentation based DCNNs may determine a bounding box for each of the people and other objects depicted in the query image. The one or more image segmentation based DCNNs may consider an object with the relatively highest level of confidence for a "person" class, e.g., one of the two or more people, to be the person of interest and consider that person of interest as the foreground and everything else in the query image as the background. In some embodiments, the one or more image segmentation based DCNNs may provide suggested bounding boxes for each of the people and/or other objects depicted in the query image to a user. The user may then select the person and/or object of interest.

In step 606, the one or more image segmentation based DCNNs may determine that the portions of the query image 610 around the mask image 605 of the person wearing the wearable item 601 are background portions and remove the background portions to obtain just the person wearing the wearable item 601. In step 608, one or more wearable items may be identified using the one or more classification based DCNNs based on the wearable item 601, e.g., the mask image 605 of the wearable item 601, obtained in step 606. For example, the one or more classification based DCNNs may be used to identify one or more wearable items based on the wearable item 601 as described above with reference to step 410 of FIG. 4. As shown in FIG. 6, the one or more identified wearable items may be displayed to a user with a person wearing the identified wearable items according to some embodiments.

Figure 7:
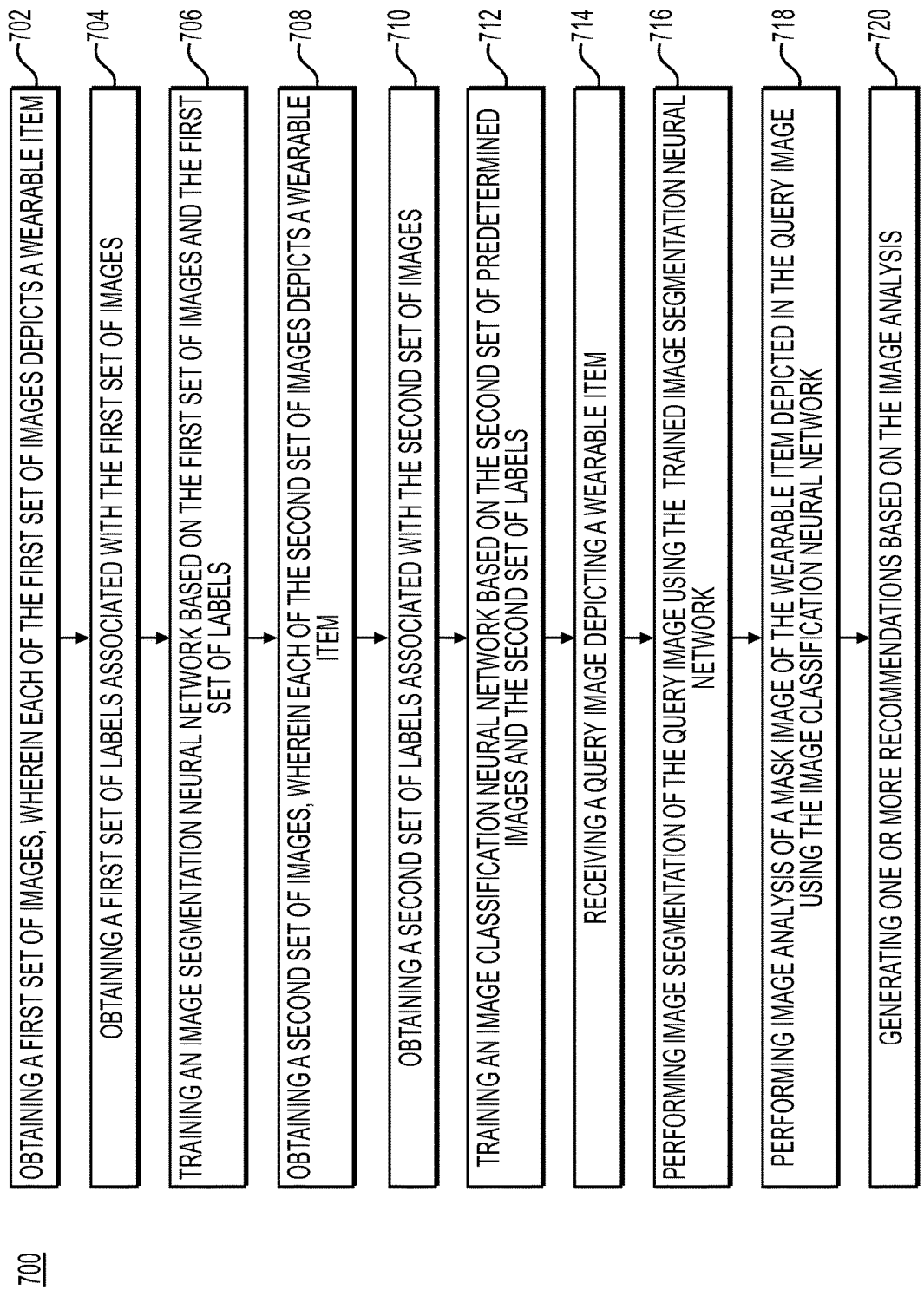
FIG. 7 depicts an exemplary method for determining one or more products based on an analysis of an image depicting the product, according to some embodiments.

FIG. 7 depicts an exemplary method 700 for performing analysis of images including products, e.g., wearable items, according to some embodiments. The method 700 includes step 702, in which one or more processors (e.g., one or more processors of the server system 102) may obtain a first set of images, wherein each of the first set of images depicts a wearable item. In step 704, the one or more processors may obtain a first set of labels associated with the first set of images. In some embodiments, each of the first set of labels may correspond to an image in the first set of images and include information indicating a mask of the wearable item depicted in the corresponding image. In step 706, the one or more processors may train an image segmentation neural network based on the first set of images and the first set of labels. In step 708, the one or more processors may obtain a second set of images, wherein each of the second set of images depicts a wearable item. In step 710, the one or more processors may obtain a second set of labels associated with the second set of images. In some embodiments, each of the second set of labels may correspond to an image in the second set of images and include information indicating classification information for the wearable item depicted in the corresponding image. In some embodiments, the classification information may include one or more product categories of the wearable item, one or more patterns of the wearable items, and one or more colors of the wearable item. In step 712, the one or more processors may train an image classification neural network based on the second set of predetermined images and the second set of labels. In some embodiments, method 700 may include a further step in which the one or more processors may test the image classification neural network based on the second set of predetermined images and the second set of labels.

In step 714, the one or more processors may receive a query image depicting a wearable item. In step 716, the one or more processors may perform image segmentation of the query image using the image segmentation neural network, wherein performing image segmentation of the query image includes removing background image portions of the query image, thereby obtaining a mask image of the wearable item depicted in the query image. In step 718, the one or more processors may perform image analysis of the mask image of the wearable item depicted in the query image using the image classification neural network. In some embodiments, the one or more processors may identify the depicted wearable item by performing the image analysis. In some embodiments, performing image analysis of the mask image may include classifying the wearable item depicted in the query image, wherein classifying the wearable item depicted in the query image may include determining one or more product categories of the depicted wearable item, determining one or more patterns of the depicted wearable item, and/or determining one or more colors of the depicted wearable item. In step 720, the one or more processors may generate one or more recommendations based on the image analysis. In some embodiments, the one or more recommendations may include one or more wearable items associated with the classified wearable item depicted in the query image.

In some embodiments, generating the one or more recommendations based on the image analysis may include obtaining the one or more wearable items based on the classified wearable item depicted in the query image; determining a similarity score for each of the one or more wearable items; and ranking the one or more wearable items based on the similarity scores. In some embodiments, method 700 may include a further step in which the one or more processors may display one or more of the ranked wearable items.

Figure 8:
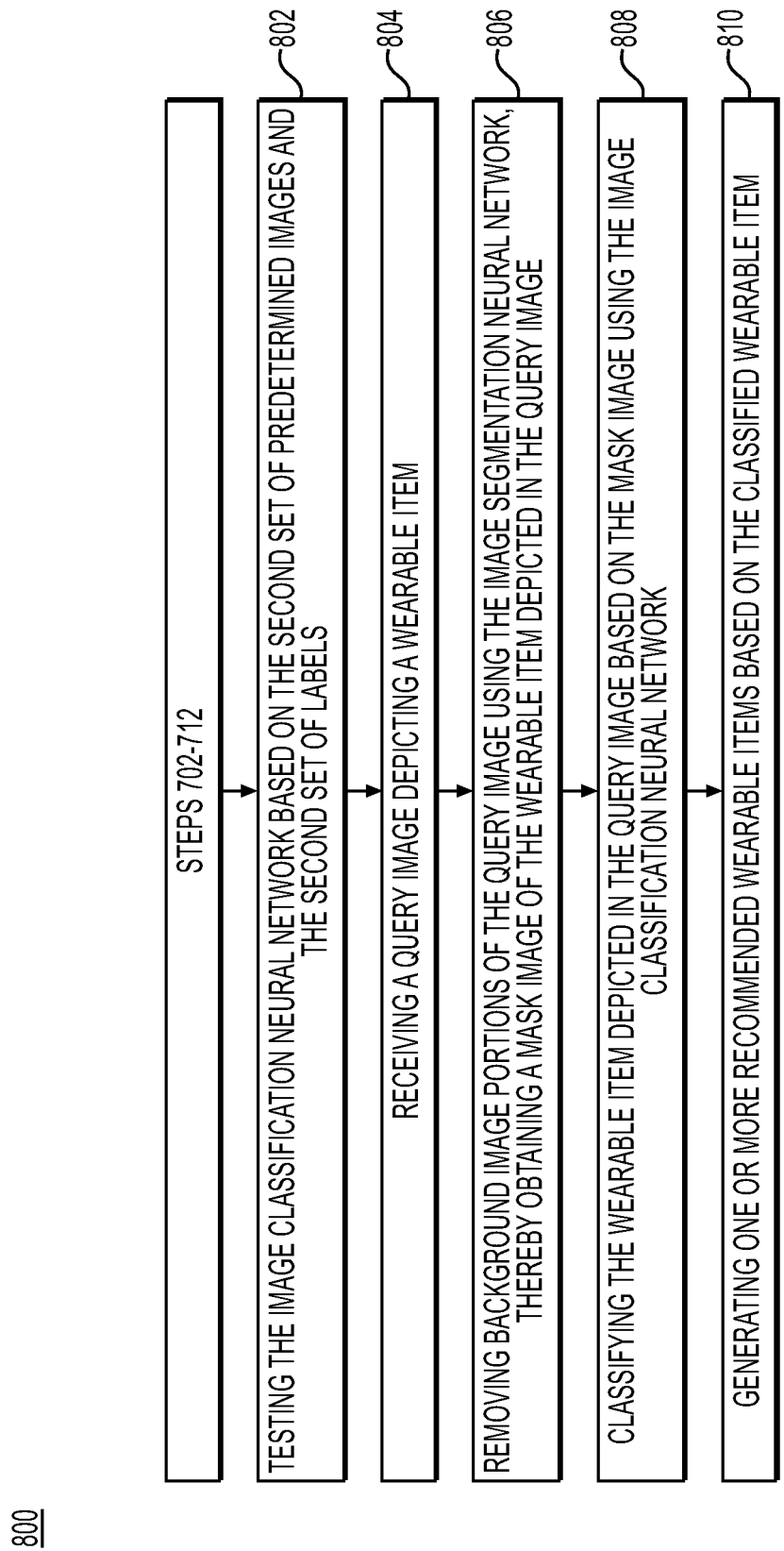
FIG. 8 depicts an exemplary method for identifying one or more products based on an analysis of an image depicting the one or more products, according to some embodiments.

FIG. 8 depicts an exemplary method 800 for performing analysis of images including products, e.g., wearable items, according to some embodiments. In some embodiments, the method 800 may include steps 702-712 as described above with reference to FIG. 7. The method 800 includes step 802, in which one or more processors (e.g., one or more processors of the server system 102) may test the image classification neural network based on the second set of predetermined images and the second set of labels. In step 804, the one or more processors may receive a query image depicting a wearable item. In step 806, the one or more processors may remove background image portions of the query image using the image segmentation neural network, thereby obtaining a mask image of the wearable item depicted in the query image. In step 808, the one or more processors may classify the wearable item depicted in the query image based on the mask image using the image classification neural network. In some embodiments, the one or more processors may identify one or more wearable items based on the classified wearable item. In step 810, the one or more processors may generate one or more recommended wearable items based on the classified wearable item. In some embodiments, the one or more recommended wearable items may be based on the identified one or more wearable items.

As shown in FIG. 9, a device 900 used for performing the various embodiments of the present disclosure (e.g., the server system 102, the user devices 112, the employee devices 116, the tenant devices 120, and/or any other computer system or user terminal for performing the various embodiments of the present disclosure) may include a central processing unit (CPU) 920. In some embodiments, the CPU 920 may be a graphics processing unit (GPU), a tensor processing unit (TPU), etc. CPU 920 may be any type of processor device including, for example, any type of special purpose or a general-purpose microprocessor device. As will be appreciated by persons skilled in the relevant art, CPU 920 also may be a single processor in a multi-core/multiprocessor system, such system operating alone, or in a cluster of computing devices operating in a cluster or server farm. CPU 920 may be connected to a data communication infrastructure 910, for example, a bus, message queue, network, or multi-core message-passing scheme.

A device 900 (e.g., the server system 102, the user devices 112, the employee devices 116, the tenant devices 120, and/or any other computer system or user terminal for performing the various embodiments of the present disclosure) may also include a main memory 940, for example, random access memory (RAM), and may also include a secondary memory 930. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 930 may include other similar means for allowing computer programs or other instructions to be loaded into device 900. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 900.

A device 900 may also include a communications interface ("COM") 960. Communications interface 960 allows software and data to be transferred between device 900 and external devices. Communications interface 960 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 960. These signals may be provided to communications interface 960 via a communications path of device 900, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. A device 900 also may include input and output ports 950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and include a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method comprising:
receiving a query image depicting at least one wearable item;
removing at least one background image portion from the query image;
obtaining a mask image corresponding to the at least one wearable item, the obtaining based on the query image with the removed at least one background image portion;
classifying, via one or more trained neural networks, the at least one wearable item in the mask image, the classifying including determining one or more categories, one or more patterns, or one or more colors of the at least one wearable item, wherein the one or more trained neural networks was trained using training data comprising a set of labels associated with a set of images, wherein each label of the set of labels corresponds to an image of the set of images and includes information indicating a mask or classification of the at least one wearable item depicted in the corresponding image;
in response to the classifying, identifying one or more stored wearable items as one or more identified or recommended wearable items based on the mask image;
ranking the one or more identified or recommended wearable items according to a similarity score for each of the one or more identified or recommended wearable items; and
displaying the ranked one or more identified or recommended wearable items.

2. The computer-implemented method of claim 1, further comprising:
determining the similarity score between the one or more identified or recommended wearable items and the at least one wearable item depicted in the mask image.

3. The computer-implemented method of claim 2, further comprising:
determining one or more distance metrics between the mask image and the one or more identified or recommended wearable items.

4. The computer-implemented method of claim 3, further comprising:
comparing the one or more distance metrics; and
assigning a higher similarity score to at least one image with a smaller distance metric.

5. The computer-implemented method of claim 1, further comprising:
classifying the mask image according to an approximate height size or an approximate width size.

6. The computer-implemented method of claim 1, wherein the mask image is mapped into a plurality of corresponding coordinates in an embedded space.

7. The computer-implemented method of claim 6, wherein the embedded space is a multi-dimensional tensor space.

8. The computer-implemented method of claim 1, further comprising:
ranking the one or more identified or recommended wearable items from a highest similarity score to a lowest similarity score in a descending order.

9. The computer-implemented method of claim 1, further comprising:
re-ranking the one or more identified or recommended wearable items based on at least one of a pattern spatial frequency, a hue, or a saturation.

10. A computer system comprising:
a data storage device storing processor-readable instructions; and
a processor configured to execute instructions to perform a method including:
receiving a query image depicting at least one wearable item;
removing at least one background image portion from the query image;
obtaining a mask image corresponding to the at least one wearable item, the obtaining based on the query image with the removed at least one background image portion;
classifying, via one or more trained neural networks, the at least one wearable item in the mask image, the classifying including determining one or more categories, one or more patterns, or one or more colors of the at least one wearable item, wherein the one or more trained neural networks was trained using training data comprising a set of labels associated with a set of images, wherein each label of the set of labels corresponds to an image of the set of images and includes information indicating a mask or classification of the at least one wearable item depicted in the corresponding image;
in response to the classifying, identifying one or more stored wearable items as one or more identified or recommended wearable items based on the mask image;
ranking the one or more identified or recommended wearable items according to a similarity score for each of the one or more identified or recommended wearable items; and
displaying the ranked one or more identified or recommended wearable items.

11. The computer system of claim 10, wherein the method further includes:
determining the similarity score between the one or more identified or recommended wearable items and the at least one wearable item depicted in the mask image.

12. The computer system of claim 11, further comprising:
determining one or more distance metrics between the mask image and the one or more identified or recommended wearable items.

13. The computer system of claim 12, further comprising:
comparing the one or more distance metrics; and
assigning a higher similarity score to at least one image with a smaller distance metric.

14. The computer system of claim 10, further comprising:
ranking the one or more identified or recommended wearable items from a highest similarity score to a lowest similarity score in a descending order.

15. A non-transitory computer-readable medium containing instructions that, when executed by a processor, cause the processor to perform a method comprising:
receiving a query image depicting at least one wearable item;
removing at least one background image portion from the query image;
obtaining a mask image corresponding to the at least one wearable item, the obtaining based on the query image with the removed at least one background image portion;
classifying, via one or more trained neural networks, the at least one wearable item in the mask image, the classifying including determining one or more categories, one or more patterns, or one or more colors of the at least one wearable item, wherein the one or more trained neural networks was trained using training data comprising a set of labels associated with a set of images, wherein each label of the set of labels corresponds to an image of the set of images and includes information indicating a mask or classification of the at least one wearable item depicted in the corresponding image;
in response to the classifying, identifying one or more stored wearable items as one or more identified or recommended wearable items based on the mask image;
ranking the one or more identified or recommended wearable items according to a similarity score for each of the one or more identified or recommended wearable items; and
displaying the ranked one or more identified or recommended wearable items.

16. The non-transitory computer-readable medium of claim 15, wherein the mask image is mapped into a plurality of corresponding coordinates in an embedded space.

17. The non-transitory computer-readable medium of claim 16, wherein the embedded space is a multi-dimensional tensor space.

18. The non-transitory computer-readable medium of claim 15, the method further comprising:
ranking the one or more identified or recommended wearable items from a highest similarity score to a lowest similarity score in a descending order.

19. The non-transitory computer-readable medium of claim 16, the method further comprising:
re-ranking the one or more identified or recommended wearable items based on at least one of a pattern spatial frequency, a hue, or a saturation.

20. The non-transitory computer-readable medium of claim 15, the method further comprising:

determining the similarity score between the one or more identified or recommended wearable items and the at least one wearable item depicted in the mask image.

\* \* \* \* \*